(12) United States Patent
Tucker

(10) Patent No.: US 7,765,247 B2
(45) Date of Patent: Jul. 27, 2010

(54) SYSTEM AND METHOD FOR REMOVING ROWS FROM DIRECTORY TABLES

(75) Inventor: John C. Tucker, Downers Grove, IL (US)

(73) Assignee: Computer Associates Think, Inc., Islandia, NY (US)

(*) Notice: Subject to any disclaimer, the term of this patent is extended or adjusted under 35 U.S.C. 154(b) by 609 days.

(21) Appl. No.: 10/911,828

(22) Filed: Aug. 5, 2004

(65) Prior Publication Data
US 2005/0114365 A1 May 26, 2005

Related U.S. Application Data

(60) Provisional application No. 60/524,704, filed on Nov. 24, 2003.

(51) Int. Cl.
G06F 17/00 (2006.01)
G06F 7/00 (2006.01)

(52) U.S. Cl. .................................................. 707/828
(58) Field of Classification Search .................. None
See application file for complete search history.

(56) References Cited

U.S. PATENT DOCUMENTS

| 4,945,474 | A | * | 7/1990 | Elliott et al. | 714/16 |
|---|---|---|---|---|---|
| 5,721,915 | A | | 2/1998 | Sockut et al. | |
| 5,887,274 | A | | 3/1999 | Barry et al. | |
| 6,993,530 | B2 | * | 1/2006 | Lee et al. | 707/100 |
| 7,007,028 | B2 | * | 2/2006 | Rashid et al. | 707/10 |
| 7,051,051 | B1 | * | 5/2006 | Stegelmann | 707/202 |
| 7,058,664 | B1 | * | 6/2006 | Hsu | 707/200 |
| 7,127,462 | B2 | * | 10/2006 | Hiraga et al. | 707/9 |
| 7,136,861 | B1 | * | 11/2006 | Sinclair et al. | 707/101 |
| 7,263,536 | B1 | * | 8/2007 | Pederson | 707/203 |
| 2001/0047360 | A1 | | 11/2001 | Huras et al. | |
| 2003/0212687 | A1 | * | 11/2003 | Gonos | 707/100 |
| 2005/0131966 | A1 | * | 6/2005 | Lou | 707/204 |
| 2005/0262071 | A1 | * | 11/2005 | Prager | 707/4 |
| 2006/0004686 | A1 | * | 1/2006 | Molnar et al. | 707/1 |

OTHER PUBLICATIONS

DB2 Developer's Guide, Fourth Edition by Craig Mullins; Publisher: Sams; Pub Date: May 11, 2000; More recent edition of this book available. Print ISBN-10: 0-672-31828-8; Print ISBN-13: 978-0-672-31828-3 Pertinent: Data Modification Guidelines, Recover Phases: Backup & Recovery Utilities; Index Image Copies.*

(Continued)

Primary Examiner—Neveen Abel Jalil
Assistant Examiner—Raheem Hoffler
(74) Attorney, Agent, or Firm—Baker Botts L.L.P.

(57) ABSTRACT

A system and method of deleting rows from a database directory table is provided. In one aspect, candidate rows to delete from a database directory table are identified. An image copy of the database directory table is created and the candidate rows are updated for deletion in the image copy. A recover module or utility recovers the database directory table from the updated image copy.

17 Claims, 2 Drawing Sheets

OTHER PUBLICATIONS

Jones K: "Odd Data in Dbases" CLX Mailing List Archive, Jul. 15, 1999, XP002319357 Retrieved from the Internet: IRL: http://he.fi/archive/clx/1999/0432.html. Retrieved on Feb. 28, 2005 the whole document.

Freidel A L S: DB2: The importance of the Modify Utility: Mainframe Week, Jan. 16, 2002, XP002319358 Retrieved from the Internet: URL: http://www.mainframeweek.com/journals/articles/0001/21 Retrieved on Feb. 28, 2005, the whole document.

Bell L: "Your can be a DB2 Recovery Expert" DBAZINE.COM, May 2002 XP002319364, retrieved from the Internet: URL: http://www.dbazine.com/ball1.html Retrieved on Feb. 28, 2005, the whole document.

* cited by examiner

SYSTEM AND METHOD FOR REMOVING ROWS FROM DIRECTORY TABLES

CROSS-REFERENCE TO RELATED APPLICATION

This application claims the benefit of U.S. Provisional Patent Application No. 60/524,704 entitled SYSTEM AND METHOD FOR REMOVING ROWS FROM DIRECTORY TABLES filed on Nov. 24, 2003, which application is incorporated herein by reference in its entirety.

TECHNICAL FIELD

This application relates to database systems, and more particularly, to removing rows from directory tables in a database system.

BACKGROUND

In database systems such as DB2™ databases, catalog tables and directory tables such as the SYSCOPY table and SYSLGRNX table store information needed by the database system for recovery. For example, information related to certain command execution and the times of execution are stored in these two tables for every tablespace defined. The two tables, thus, accumulate many records for every tablespace in a DB2™ system.

As these two tables grow, any process accessing or using the tables will consume more and more resources. For instance, making image copy of tablespaces that correspond to these tables, and reorganization of these tables will take longer. Scanning the tables will consume more CPU and I/O operations. Other negative system impacts associated with large catalog and directory tables exist. Thus, it is desirable to delete old and obsolete entries from these two tables on a regular basis.

In these database systems, however, catalog and directory tables as those described above are considered as objects that are critical for the operation and function of the databases, and thus, the database systems do not permit accesses to the tables using SQL operations such as INSERT, DELETE, and UPDATE. Although special utilities exist for cleaning up these tables, the utilities need to be purchased separately by the users of the database systems. MODIFY RECOVERY utility from IBM is one example of a separately packaged utility that deletes SYSCOPY rows and SYSLGRNX entries based on age or date. Thus, for example, users may need to purchase a separate utility in order to clean up their directory table. Accordingly, a method and system is needed to be able to delete one or more rows from a database directory.

SUMMARY

A system and method of deleting rows from a database directory table is provided. A method of deleting rows from a database directory table in one aspect includes identifying candidate rows to delete from a database directory table. An image copy of the database directory table is created and the image copy is updated to indicate the deletion of the candidate row. The database directory table is then recovered from the image copy.

A system for deleting rows from a database directory table in one aspect includes a row identifier module operable to identify one or more rows to delete from a database directory table. An image copy module is operable to make an image copy of the database directory table and an image copy update module is operable to update the one or more rows for deletion in the image copy. A recover module is operable to recover the database directory table from the image copy Further features as well as the structure and operation of various embodiments are described in detail below with reference to the accompanying drawings. In the drawings, like reference numbers indicate identical or functionally similar elements.

DETAILED DESCRIPTION

Figure 1:
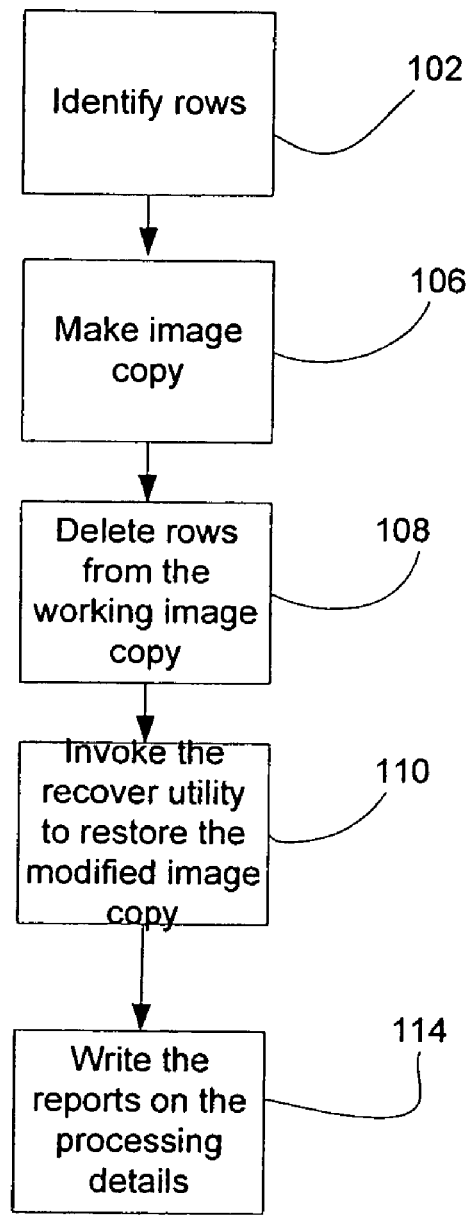
FIG. 1 is a flow diagram illustrating a method of deleting rows in a directory table.

FIG. 1 is a flow diagram illustrating a method of deleting rows in a directory table. Briefly, SYSCOPY (full name SYSIBM.SYSCOPY) is a table defined in the DB2 catalog, which contains information needed for recovery. SYSLGRNX (full name SYSIBM.SYSLGRNX, also referred to as SYSLGRNG) is a table defined in the DB2 directory, database DSNDB01. This table stores entries related to recovery log ranges such as the time an index space was defined with COPY YES and the time a tablespace was open for update. This table may not be referenced using SQL operations.

At 102, rows to delete from the SYSLGRNX are identified. In one embodiment, the rows may be identified by examining the rows in the SYSCOPY table. For example, the oldest recovery point may be identified, and all rows predating the oldest recovery point may be identified as rows to delete. The corresponding rows in the SYSLGRNX may be identified from the rows identified in the SYSCOPY table. In one embodiment, DB2 indexes may be utilized to build a list of the rows to delete from the SYSLGRNX table.

At 106, image copy utility is invoked to take an image copy of the DSNDB01.SYSLGRNX tablespace. In one embodiment, the COPY utility is invoked twice. The first time, it generates the extreme fallback image copy. In one aspect, the first copy needs only a LP copy. The second time it generates the working image copy and the fallback image copy. These second copies are LP and LB copies. The LP copy is used as an operating copy, while the LB copy remains untouched for recovery processing and for verification that the correct rows were deleted. The image copy dataset names generated are saved for later processing.

For instance, when invoking the COPY utility, a user can specify in the COPY utility syntax of what types of image copy datasets the user wishes to create. These types may be a local site primary image copy or LP, a local site backup image copy or LB, a recovery site primary image copy or RP or recovery site backup image copy or RB. The "LP", "LB", "RP", and "RB" are values of the ICBACKUP column SYSIBM.SYSCOPY table that are recorded by the COPY utility as part of registering the image copy dataset.

The LP and LB copies are generally used on the local primary DB2 system during a recovery. The RP and RB copies are generally used at a recovery site during a disaster recovery. The DB2 RECOVER utility attempts to use the LP image copy first during a local recovery. If the LP image copy is unavailable, the RECOVER utility switches over to use the LB image copy, if any, to complete the recovery.

At 108, the rows identified for deletion are deleted from the working image copy dataset, the copy which was made at step 106. Additional allocation bits in the SPACEMAP pages may be adjusted as a result of the deleted rows. The rows may be deleted from the working image copy dataset using any known method to modify a file in a computer system. For instance, the rows are deleted by preserving the internal structures of the DB2 data pages. The delete process simulates the actions that would be taken by the DB2 database system if it was to perform the delete. Internal data page formats are described in the DB2 vendor manuals. The row is turned into a large hole on the page, the corresponding page header is adjusted to reflect the presence of the hole and the ID (identifier) on the page is flagged as being deleted.

At 110, a RECOVER utility is invoked to recover the DSNDB01.SYSLGRNX tablespace and to rebuild the indexes defined on the SYSLGRNX table. The recovery is performed using the modified working image copy that has the rows deleted, thus, providing the effect of deleting the selected rows from the DB2 database. In one aspect, while the RECOVER is invoked against this tablespace, no other utilities may execute concurrently. Thus, in one aspect, the RECOVER utility is an exclusive utility. The process of invoking the RECOVER utility, in one embodiment, includes retry logic to invoke the RECOVER in the case of a failure due to concurrency issues, for example, if another utility is working on the same tablespace.

In this embodiment, the RECOVER utility may be retried, for instance, after a waiting for a predetermined amount of time. The retry may occur for a predetermined number of times, for example, 3 retries. If the RECOVER fails for any other reason, a fallback mode kicks in. This fallback mode is responsible for renaming the working image copy dataset, which prevents the modified image copy from being used during a recover, and re-running the RECOVER utility. This places the DSNDB01. SYSLGRNX tablespace back into its prior state. In the fallback mode, the RECOVER completes.

Optionally, at 114, a report may be produced. In one embodiment, the report lists the contents of the rows deleted from SYSLGRNX. An example of a report includes records that will be marked for deletion from SYSIBM.SYSLGRNX. These records are ordered by DBID, PSID, PART, and START LRSN descending. Another report may include the deleted rows by page number.

The system and method described in the present application, in one aspect, allows the deleting of the rows in the SYSCOPY table and the deleting of the rows in the SYSLGRNX table to be separated. For instance, in one embodiment, a process or a module that deletes rows from the SYSCOPY table may be separately controlled or invoked from a process or a module that deletes the corresponding rows from the SYSLGRNX table, thus allowing the deletion of rows from the SYSLGRNX table to be delayed after deleting rows from the SYSCOPY table. This separation mechanism allows other processes to insert rows into the SYSCOPY table if a prior deletion from SYSCOPY was made in error. Further, if a recovery of that tablespace/index space is needed, the SYSLGRNX table may be used to improve the recovery.

In another embodiment, the rows may be identified manually at 102. For instance, the rows may be identified manually by an exhaustive search of the pages in the SYSLGRNX tablespace looking for rows that apply to the selected tablespace. This search may use any means necessary to print or view the individual pages. The supplied DB2 utility DNS1PRNT may be used for such purpose. If desired, a user may also use the DSN1PRNT on the unique index to manually traverse the internal index structure to identify the SYSLGRNX tablespace pages of the selected tablespace.

In another embodiment, the rows may be identified using the information found in DB2 log records. The DB2 DSN01LOGP log print utility may be used to format the DB2 log records corresponding to inserts made to the index DSN-LLX01. The log records include the internal page numbers of the affected index and tablespace pages as well as the actual data contained in the SYSLGRNX table.

Once target pages are identified, steps 106, 108, and 110 are performed. For instance, an image copy of the DSNDB01.SYSLGRNX tablespace may be taken. The identified image copy page may be edited, for example, using a file editor, and the selected rows may be deleted. The rows are deleted, for instance, by preserving the internal structures of the DB2 data pages. The delete process simulates the actions that would be taken by the DB2 database system if it was to perform the delete. The internal data page formats are published in the respective database vendors' manuals.

The row is turned into a large hole on the page, the corresponding page header is adjusted to reflect the presence of the hole and the ID on the page is flagged as being deleted. Once the rows have been deleted from the image copy, a recover utility may be invoked to recover the DSNDB01.SYSLGRNX tablespace along with rebuilding the indexes defined on the DSNDB01.SYSLGRNX tablespace.

Figure 2:
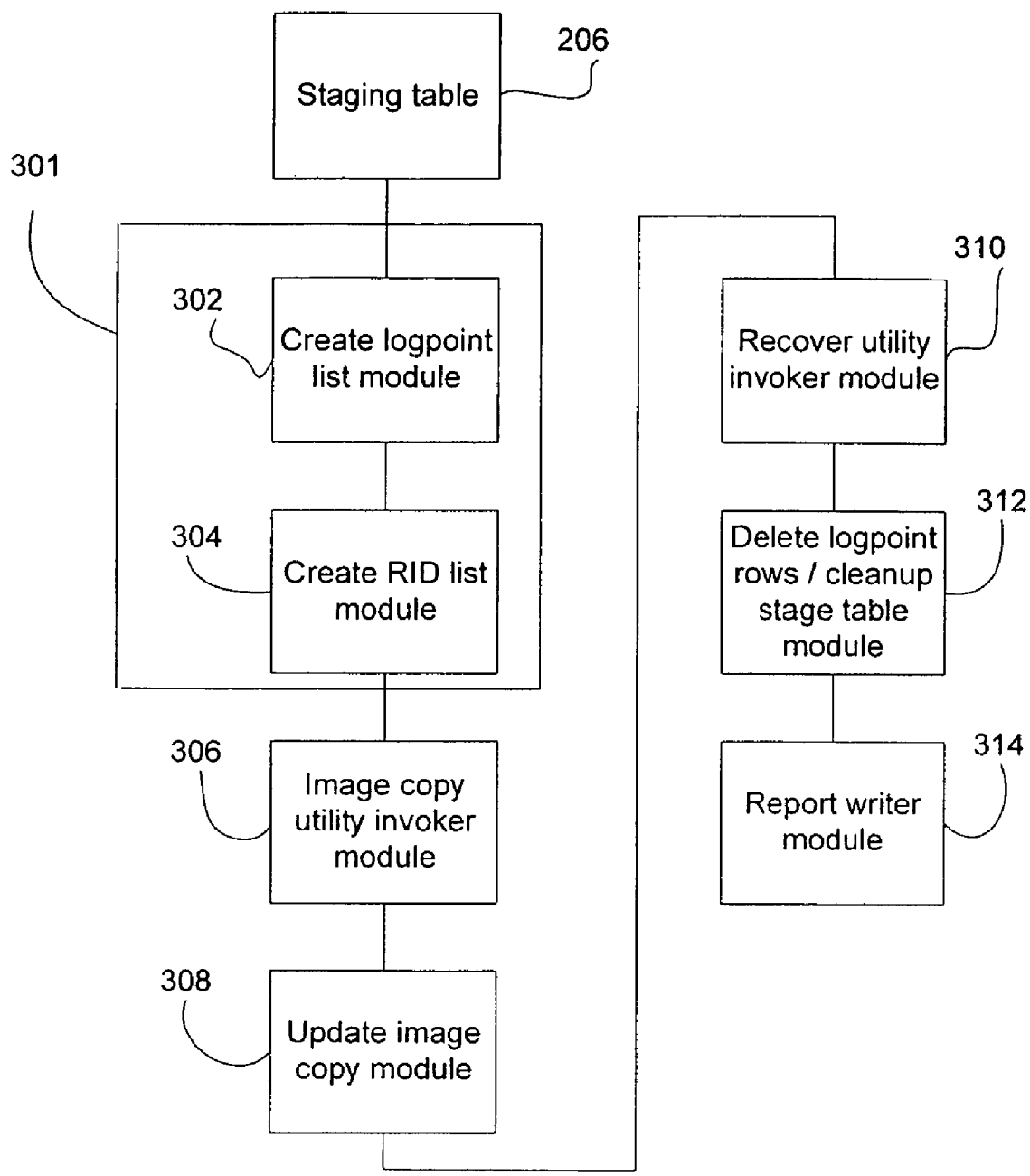
FIG. 2 is a flow diagram illustrating the system components and their flow process for deleting entries in a directory table in one embodiment.

FIG. 2 is a diagram illustrating the system components and their flow process for deleting entries in a directory table in one embodiment. In one embodiment, a module 301 that identifies candidate rows for deletion may include a module 302 that creates a logpoint list and a module that creates row identifier (RID) list 304, for example, using a staging table 206.

In one embodiment, a staging table is a DB2 table that holds the starting points for SYSLGRNX deletion. The starting points in the staging table may point to other objects that include the rows to delete. The staging table 206 entries, that is, the starting points, are determined from the oldest rows in the SYSCOPY table.

Using any process that can delete SYSCOPY rows, a user may select the starting point of the SYSLGRNX deletion by comparing all of the values of the START_RBA column from the deleted SYSCOPY rows. In one embodiment, the highest START_RBA column value will be the starting point for the SYSLGRNX deletion.

The create logpoint list module 302 in one embodiment fetches rows from the staging table 206 and converts the rows into nodes in the log point list. A Node refers to an allocated piece of storage used to contain a data structure. In this context, the rows from the staging table are fetched and the data from each row is copied into separate piece of working storage connected together using the log point list, a linked list, in one embodiment. The created log point list is ordered by DBID ascending, PSID ascending, DSNUM ascending, and LOGPOINT descending in one embodiment.

DBID refers to a database identifier, that is, internal identifier assigned by DB2 to track a DB2 database. PSID refers to a pageset identifier, that is, an internal identifier assigned by DB2 for z/OS and OS/390. DSNUM refers to an integer that identifies the partition number of a partitioned pageset. In a segmented or simple pageset, the DSNUM is zero (0). Specifying a DSNUM of zero for a partitioned pageset implies all pagesets. LOGPOINT refers to a unique point in the DB2 log. In a data sharing environment, this is a LRSN and in non-sharing it is a LOG RBA. LRSN refers to log record sequence number. LRSN is used to uniquely identify a log record in a data-sharing environment. It is based on a STCK time value truncated to a 6 byte binary value. STCK refers to a stored clock MVS time value based on the TOD (time of day) clock 8 bytes long. LOG RBA is the relative byte address of a log record contained in a DB2 log dataset. It is a 6 byte binary value.

The nodes are consolidated so that only one entry for each DBID, PSID, and DSNUM exist. For partitioned objects, the DSNUM of zero indicates that all parts use the same LOGPOINT.

The index module 304 creates the RID list using the log point list created by the module 302. RID refers to a row identifier and includes a page number and an ID on that page. An RID is used to uniquely identify a row in a table. For each node in the logpoint list, the index module 304 reads the unique index defined on SYSLGRNX, DSNDB01.DSNLLX01. The index is defined as a TYPE 2 index, for instance, for internal format and processing. The RID from each entry is inserted into the ordered RID list. The key of the RID list is the RID number, which is made up of a PAGE number, and ID number. This allows the Image Copy update task to efficiently process the pages to be updated with one pass through the dataset.

Once starting index entry is located on a non-leaf page, the leaf-page pointers may be used to continue retrieving entries. Briefly, a leaf page refers to a page that contains pairs of keys and RIDs and that points to actual data. Non-leaf page refers to a page that contains keys and page numbers of other pages in the index (either leaf or nonleaf pages). The RID from each entry is inserted into the ordered RID list.

The image copy utility invoker module 306 invokes a copy utility such as the IBM COPY utility to take an image copy of the DSNDB01.SYSLGRNX tablespace. In one embodiment, this module is invoked twice and the image copy dataset names are passed in to a calling function and saved. Thus in one embodiment, two separate image copies of the DSNDB01.SYSLGRNX tablespace is produced. The output of the first copy is referred to as the extreme fallback image copy. The following statement is an example of a first copy request: COPY TABLESPACE DSNDB01.SYSLGRNX; COPYDDN (LOCALDD1) SHRLEVEL CHANGE. This copy is used to recover the SYSLGRNX tablespace, in case the main recover step of the SYSLGRNX process fails.

The second copy includes two image copy datasets, a local primary and a local backup. The following statement is an example of a second copy request: COPY TABLESPACE DSNDB01.SYSLGRNX; COPYDDN (LOCALDD1, LOCALDD2) SHRLEVEL CHANGE. The image copy utility invoker module 306 calculates the required size of the image copy datasets and dynamically allocates the output datasets to the associated DDNAME. The image copy names are created and have the following format in one embodiment:
HIGHLVL.SYSLGRNX.SSIDLP.DYYYYD-
  DD.THHMMSS;
HIGHLVL.SYSLGRNX.SSIDLB.DYYYYD-
  DD.THHMMSS.

In one embodiment, an image copy name generator module is used to generate image copy dataset names. The names are generated, for instance, from four dataset name masks. Each mask is used to generate a dataset name. The mask may contain symbolic variables that are supported by the operating system. These symbolic variables are also known as system symbols. In addition to the system symbols, user defined symbols may also be used. Examples of user defined symbols are:
  &ICBACKUP which is 2 bytes long and contains the value of "LB" for local backup or "LP" for local primary;
  &SSID which is a maximum of 4 bytes long and contains the name of the DB2 subsystem;
  &HIGHLVL which is a maximum of 8 bytes long and is used for the first qualifier of the dataset name.

The IC-NAME mask is used for the generation of the extreme fallback copy and the two image copy dataset names in one embodiment. An example of a value of the IC-NAME mask value:
  &HIGHLVL..SYSLGRNX.&SSID..&
    ICBACKUP.D&&YR4..&&JDAY..&&HHMMSS The IC-NORMAL is the mask that is used to generate a name to rename the local backup copy upon a successful completion of the recover utility invoker module 310 in one embodiment. An example of the IC-NORMAL mask value:
  &HIGHLVL..NORMAL.&SSID..&
  ICBACKUP.D&&YR4..&&JDAY..&&HHMMSS The IC-PREVIEW mask is used to generate a name which renames the local primary copy or working image copy during a PREVIEW VERIFY process in one embodiment. An example of the IC-PREVIEW mask value:
&HIGHLVL..PREVIEW.&SSID..&ICBACKUP.
  D&&YR4..&&JDAY..&&HHMMSS The IC-ERROR mask is used to generate a name that is used by the recover utility invoker module 310 to rename the working image copy dataset whenever the RECOVER fails in one embodiment. An example of the IC-ERROR mask value:
&HIGHLVL..ERROR.&SSID..&ICBACKUP.D&&
  YR4..&&JDAY..&&HHMMSS The use of the dataset name masks allows for dynamic generation of the image copy names during execution.

The image copy update module 308 processes the ordered RID list. For each node in this list, the module performs the functions to delete the RID from the working image copy dataset. In one embodiment, the following steps are performed during the image copy update process: a SPACEMAP page covering a given RID is calculated; the SPACEMAP page is read into the main storage; the page for the RID is read; RID on the page is deleted.

The recover utility invoker module 310 invokes the IBM RECOVER utility to recover the DSNDB01.SYSLGRNX tablespace. When IBM RECOVER is invoked against this tablespace, no other IBM utilities may execute concurrently. The recover utility invoker module 310 includes a retry logic, which retries invoking the IBM RECOVER utility when the IBM RECOVER utility fails due to concurrency. If the RECOVER fails for any other reason, the recover utility invoker module 310 is responsible for renaming the working image copy dataset, and re-running the recover.

In one embodiment, the following syntax may be used to control the IBM recover utility as well as determining if that utility was successful: RECOVER TABLESPACE DSNDB01.SYSLGRNX; REBUILD INDEX(ALL); TABLESPACE DSNDB01.SYSLGRNX; SORTDEVT SYSDA; SORTNUM 03. If the primary IBM recover fails, the IBM utility may be terminated using the TERM UTIL command. In one embodiment, an ATTACH to the DSNUTILB IBM load module may be performed to drive the invoking of the IBM recover utility.

The cleanup stage table module 312 deletes rows from the staging table, for instance, after a successful deletion of rows in SYSLGRNX. Further, when a table is dropped, space in DBD (database descriptor) may be reclaimed. The report writer module 314 writes reports showing the details of what was processed.

The following shows an example of a SYSLGRNX row layout.

| LOC | Column Name | Data Type | Description |
|-----|-------------|-----------|-------------|
| 00 | PGSFLAGS | CHAR (1) | Flag byte |
| 01 | PGSLTH | CHAR (2) | Length of record |
| 03 | PGSOBID | CHAR (2) | OBID (X'00D1') |
| 05 | PGSBID | CHAR (1) | ID map entry that points to this record |
| 06 | LGRDBID | CHAR (2) | DBID of the modified object |
| 08 | LGRPSID | CHAR (2) | OBID of the modified object |
| 0A | LGRUCDT | CHAR (6) | Modification date: mmddyy. |
| 10 | LGRUCTM | CHAR (8) | Modification time: hhmmssth. |
| 18 | LGRSRBA | CHAR (6) | Starting RBA |
| 1E | LGRERBA | CHAR (6) | Ending RBA |
| 24 | LGRPART | SMALLINT | Tablespace partition number |
| 26 | LGRSLRSN | CHAR (6) | Starting LRSN of update log records for data sharing. '000000000000' otherwise |
| 2C | LGRELRSN | CHAR (6) | Ending LRSN of update log record for data sharing |
| 32 | LGRMEMB | CHAR (2) | Data sharing member ID of the modifying DB2 subsystem. X'0001' for non-data sharing |

The following is an example of staging table with 3 rows of entries.

| DBNAME | SPACENAM | DBID | PSID | PART | MEMB | START LRSN |
|--------|----------|------|------|------|------|------------|
| PDJCTDB | UNIXCODE | 0424 | 0087 | 0000 | 0000 | 0124876D35A0 |
| PDJCTDB | UNIXCDE3 | 0424 | 00A8 | 0000 | 0000 | 012DFBA8DD66 |
| PDJCTDB | UNICDEXC | 0424 | 00AF | 0000 | 0000 | 012DFBA8DD66 |

From the above entries in the staging table, candidate rows in the directory table are determined.

In one embodiment, deletion of the SYSLGRNX rows may be performed via a command line syntax option such as: MODFY SYSLGRNX. Additional keywords such as PREVIEW, YES, SELECT, VERIFY, NO may be used. When SELECT or YES option is used, the SYSLGRNX delete process retrieves rows from the staging table and identifies the rows that would be deleted from SYSIBM.SYSLGRNX. When VERIFY option is used, the SYSLGRNX delete process retrieves rows from the staging table, identifies the rows which would be deleted from SYSIBM.SYSLGRNX, takes image copies, renames the working image copy and updates the renamed working image copy to simulate the actual row deletion process. When NO option is used, the SYSLGRNX delete process proceeds through all the phases. Additional parameters may be supported.

The system and method of the present disclosure may be implemented and run on a general-purpose computer. The system and method of the present disclosure, for example, may be run during a maintenance cycle for a database system such as a DB2 subsystem, but not limited to such. The embodiments described above are illustrative examples and it should not be construed that the present invention is limited to these particular embodiments. Although the description was provided using the IBM DB2 database system as an example, it should be understood that the method and system disclosed in the present application may apply to other database systems. Thus, various changes and modifications may be effected by one skilled in the art without departing from the spirit or scope of the invention as defined in the appended claims.

I claim:

1. A method of deleting rows from a database directory table, comprising:
    identifying candidate rows to delete from a first table comprising a database directory table, the database directory table not accessible using a delete operation, wherein the identifying includes determining an old row entry from a database catalog table and using the old row entry as a starting point in the database directory table for deleting rows in the database directory table;
    creating a second table comprising an image copy of the database directory table;
    using a delete operation to delete the candidate rows from the image copy; and
    recovering the database directory table from the image copy.

2. The method of claim 1 further comprising:
    correlating the old row entry with an associated row entry in the database directory table.

3. The method of claim 1, wherein the creating an image copy includes creating a working image copy and a fallback image copy of the directory table.

4. The method of claim 3, further including:
    deleting the candidate row from the working image copy.

5. The method of claim 3, further including:
    renaming the fallback image copy as the working image copy if the deleting fails.

6. The method of claim 1, further including providing a report associated with the rows identified for deletion.

7. The method of claim 1, wherein the identifying includes automatically generating a list of one or more starting points in a file, the starting point indicating a starting row to delete in the database directory table.

8. The method of claim 7, further including deleting the starting point that was used to successfully delete one or more rows in the database directory table.

9. A system for deleting rows from a database directory table, comprising:
    a database storing a database directory table; and
    a computer with access to the database directory table, the computer comprising:
    a row identifier module operable to identify one or more rows to delete from a first table comprising the database directory table, the database directory table not accessible using a delete operation, wherein the identifying includes determining an old row entry from a database catalog table and using the old row entry as a starting point in the database directory table for deleting rows in the database directory table;
    an image copy module operable to create a second table comprising an image copy of the database directory table;

an image copy update module operable to use a delete operation to delete the one or more rows in the image copy; and a recover module operable to recover the database directory table from the image copy.

10. The system of claim 9, wherein the row identifier module includes:

a log point module operable to generate a log point list for indexing into a database directory table; and an index module operable to generate one or more row identifiers from the log point list, the row identifiers for identifying one or more rows to be deleted in the database directory table.

11. The system of claim 10, wherein the index module is further operable to order the one or more row identifiers into an ordered list of one or more row identifiers.

12. The system of claim 9, wherein the image copy module is operable to make a working image copy and a fallback image copy of the database directory table.

13. The system of claim 12, wherein the recover module is further operable to use the fallback image copy to recover, if an error occurred on the working image copy.

14. A program storage device readable by a computer, tangibly embodying a program of instructions executable by the computer to perform method of deleting rows from a database directory table, comprising:

identifying candidate rows to delete from a first table comprising a database directory table, the database directory table not accessible using a delete operation, wherein the identifying includes determining an old row entry from a database catalog table and using the old row entry as a starting point in the database directory table for deleting rows in the database directory table;

creating a second table comprising an image copy of the database directory table;

using a delete operation to delete the candidate rows from the image copy; and recovering the database directory table from the image copy.

15. The program storage device of claim 14, further comprising correlating the old row entry with an associated row entry in the database directory table.

16. The program storage device of claim 14, wherein the creating an image copy includes creating a working image copy and a fallback image copy of the directory table.

17. The program storage device of claim 16, further including:

deleting the candidate row from the working image copy.

* * * * *